(12) United States Patent
Saarinen

(10) Patent No.: US 11,641,376 B2
(45) Date of Patent: May 2, 2023

(54) PROTECTION OF TRAFFIC BETWEEN NETWORK FUNCTIONS

(71) Applicant: Telefonaktiebolaget LM Ericsson (publ), Stockholm (SE)

(72) Inventor: Pasi Saarinen, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 16/761,334

(22) PCT Filed: Oct. 31, 2018

(86) PCT No.: PCT/EP2018/079831
§ 371 (c)(1),
(2) Date: May 4, 2020

(87) PCT Pub. No.: WO2019/096586
PCT Pub. Date: May 23, 2019

(65) Prior Publication Data
US 2021/0037026 A1    Feb. 4, 2021

Related U.S. Application Data

(60) Provisional application No. 62/588,665, filed on Nov. 20, 2017.

(51) Int. Cl.
*H04L 29/06* (2006.01)
*H04L 9/40* (2022.01)
*H04L 9/30* (2006.01)

(52) U.S. Cl.
CPC ............... *H04L 63/18* (2013.01); *H04L 9/30* (2013.01); *H04L 63/1416* (2013.01)

(58) Field of Classification Search
CPC ....................................................... H04L 63/18
See application file for complete search history.

(56) References Cited

U.S. PATENT DOCUMENTS 6,950,947 B1 *  9/2005 Purtell ................ H04L 63/0218
370/231
10,085,199 B1 *  9/2018 Shaw ..................... H04W 24/04
(Continued)

OTHER PUBLICATIONS

Unknown, Author, "NF Discovery across PLMN", 3GPP TSG SA WG2 Meeting #116; S2-164161; Vienna, Austria, Jul. 11-15, 2016, pp. 1-6.

*Primary Examiner* — Bradley W Holder
(74) *Attorney, Agent, or Firm* — Murphy, Bilak & Homiller, PLLC

(57) ABSTRACT

Methods and network equipment in a core network for intercepting protected communication between core network (CN) network functions (NFs). A method performed by network equipment in a core network may include establishing a first connection with a first NF for which the network equipment serves as a proxy and establishing, on behalf of the first NF, a second connection that is towards a second NF and that is secure. The method may also include selectively forwarding communication between the first and second NFs over the first and second connections, including transmitting and/or receiving the communication on behalf of the first NF over the second connection. The method may further include intercepting the communication that the network equipment selectively forwards between the first and second NFs.

16 Claims, 9 Drawing Sheets

(56) References Cited

U.S. PATENT DOCUMENTS

| | | | |
|---|---|---|---|
| 2003/0131259 A1* | 7/2003 | Barton | H04L 63/0281 |
| | | | 713/150 |
| 2004/0062399 A1* | 4/2004 | Takase | H04L 63/0428 |
| | | | 380/277 |
| 2013/0054831 A1* | 2/2013 | Calo | H04L 67/563 |
| | | | 709/238 |
| 2015/0271203 A1 | 9/2015 | Duminuco et al. | |
| 2015/0381583 A1 | 12/2015 | Martini | |
| 2017/0303259 A1 | 10/2017 | Lee et al. | |

* cited by examiner

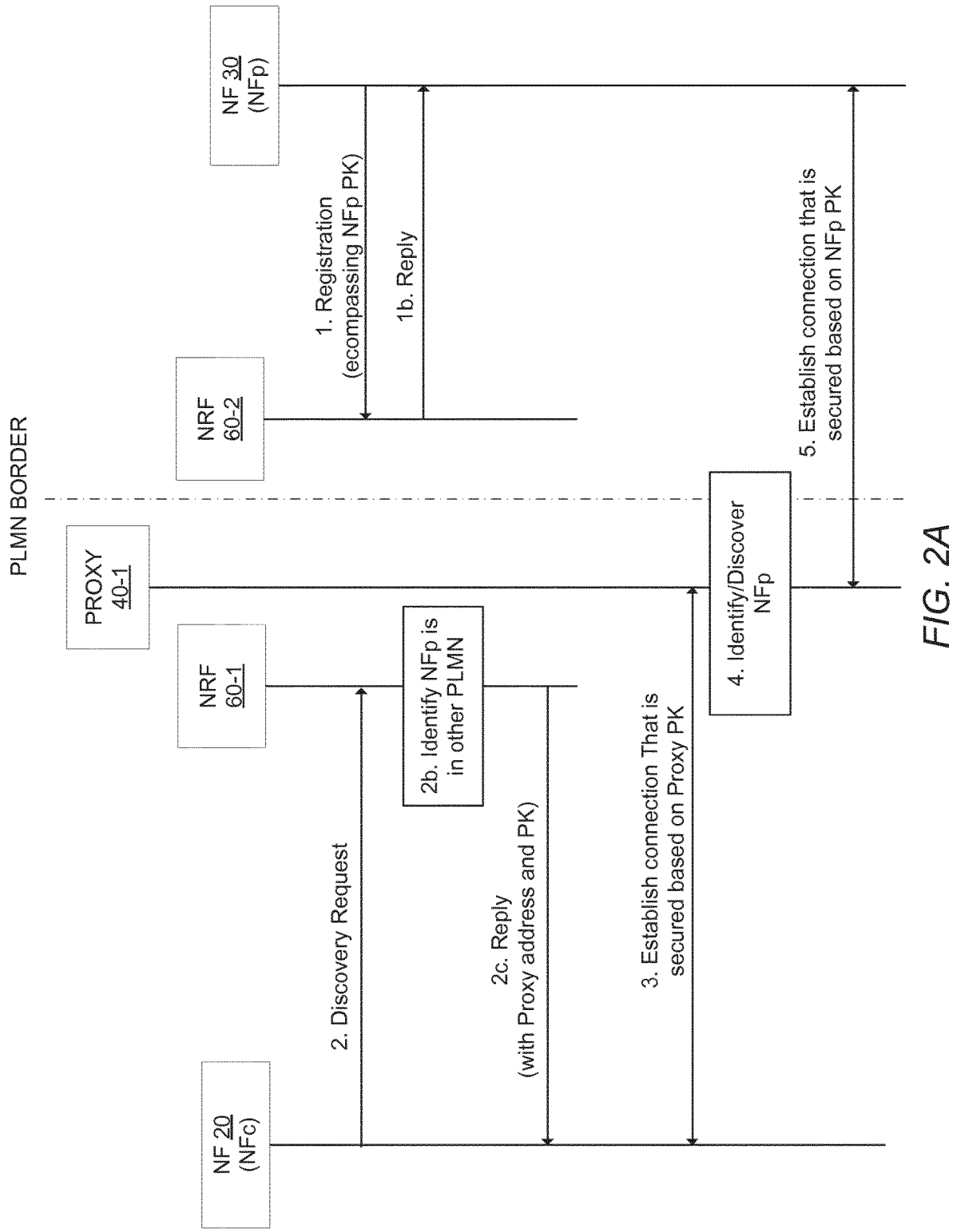

PROTECTION OF TRAFFIC BETWEEN NETWORK FUNCTIONS

TECHNICAL FIELD

The present disclosure relates to a method and network equipment in a core network for intercepting protected communication between network functions (NFs) in the core network(s).

BACKGROUND

The next generation (5G) core network (CN) will use a service-based architecture that leverages service-based interactions between CN network functions (NFs). NFs in this regard enable other authorized NFs to access their services. Alternatively or in addition to predefined interfaces being defined between network elements, an NF needing to consume a service of a certain type queries a so-called network repository function (NRF) to discover and communicate with another NF that provides that certain type of service.

In particular, NFs can take on a provider role as a provider of a service (NFp) and/or a consumer role as a consumer of a service (NFc). An NFp starts and registers itself to the NRF. This registration allows the NRF to be aware that the NFp exists. At a later point, an NFc that needs to use a specific service runs a procedure called discovery towards the NRF. In case the NRF has a registered NFp that matches this discovery request, the NRF provides the NFc with information needed to set up communication with the NFp. This information may be for example the IP address and port of the NFp.

The service-based architecture advantageously enables greater flexibility and speed in the development of new CN services, as it becomes possible to connect to other components without introducing new interfaces. The service-based architecture also introduces the possibility to use application programming interfaces (APIs) based on web technology that make development easier, as libraries and development tools for such technology are already broadly available. The service-based architecture nonetheless introduces challenges to protecting communication between NFs, especially in a way that provides network operator flexibility and inter-network or inter-slice security.

SUMMARY

Some embodiments herein protect communication between core network (CN) network functions (NFs) in a way that enables authorized network equipment (e.g., one or more edge proxies) to intercept the protected communication, e.g., to make sure the communication is not malicious, to perform load balancing, etc. This means in some embodiments that NFs in different public land mobile networks (PLMNs) or different network slices may communicate securely without jeopardizing or thwarting the security or loading of a network or slice.

More particularly, embodiments herein include a method performed by network equipment in a core network for intercepting protected communication between core network, CN, network functions, NFs. The method may include establishing a first connection with a first NF for which the network equipment serves as a proxy and establishing, on behalf of the first NF, a second connection that is towards a second NF and that is secure. The method may also include selectively forwarding communication between the first and second NFs over the first and second connections, including transmitting and/or receiving the communication on behalf of the first NF over the second connection. The method may further include intercepting the communication that the network equipment selectively forwards between the first and second NFs.

Other embodiments herein also include a method performed by network equipment in a core network for facilitating interception of protected communication between core network (CN) network functions (NFs). The method includes receiving a discovery request that requests information indicating an NF service provider available to provide a service to an NF service consumer. The method may also include, in response to the discovery request, replying with information indicating a proxy of the NF service provider or a proxy of the NF service consumer and with security information based on which a connection with the indicated proxy is to be secured.

Other embodiments herein also include a Network equipment configured for use in a core network for intercepting protected communication between core network, CN, network functions, NFs. The network equipment is configured to establish a first connection with a first NF for which the network equipment serves as a proxy, on behalf of the first NF, establish a second connection that is towards a second NF and that is secure. The network equipment may further be configured to selectively forward communication between the first and second NFs over the first and second connections, including transmitting and/or receiving the communication on behalf of the first NF over the second connection. And the network equipment may further be configured to intercept the communication that the network equipment selectively forwards between the first and second NFs.

Other embodiments herein also include a Network equipment configured for use in a core network for facilitating interception of protected communication between core network (CN) network functions (NFs). The network equipment is configured to receive a discovery request that requests information indicating an NF service provider available to provide a service to an NF service consumer. And in response to the discovery request, the network equipment may further be configured to reply with information indicating a proxy of the NF service provider or a proxy of the NF service consumer and with security information based on which a connection with the indicated proxy is to be secured.

Other embodiments herein also include a Network equipment configured for use in a core network for intercepting protected communication between core network, CN, network functions, NFs. The network equipment comprises processing circuitry and memory, the memory containing instructions executable by the processing circuitry wherein the network equipment is configured to establish a first connection with a first NF for which the network equipment serves as a proxy, On behalf of the first NF, establish a second connection that is towards a second NF and that is secure. The network equipment may further be configured to selectively forward communication between the first and second NFs over the first and second connections, including transmitting and/or receiving the communication on behalf of the first NF over the second connection; and the network equipment may further be configured to intercept the communication that the network equipment selectively forwards between the first and second NFs.

Other embodiments herein also include a Network equipment configured for use in a core network for facilitating interception of protected communication between core network (CN) network functions (NFs). The network equipment comprises processing circuitry and memory, the memory containing instructions executable by the processing circuitry wherein the network equipment is configured to receive a discovery request that requests information indicating an NF service provider available to provide a service to an NF service consumer. And in response to the discovery request, the network equipment may further be configured to reply with information indicating a proxy of the NF service provider or a proxy of the NF service consumer and with security information based on which a connection with the indicated proxy is to be secured.

Other embodiments herein also include a computer program. The computer program comprises instructions which, when executed by at least one processor of network equipment, causes the network equipment device to perform the methods above.

Other embodiments herein also include a carrier containing the computer program, wherein the carrier is one of an electronic signal, optical signal, radio signal, or computer readable storage medium.

BRIEF DESCRIPTION OF THE DRAWINGS

The inventive concept is now described, by way of example, with reference to the accompanying drawings, in which:

FIGS. 2A-2D are schematic diagrams illustrating embodiments presented herein;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1A:
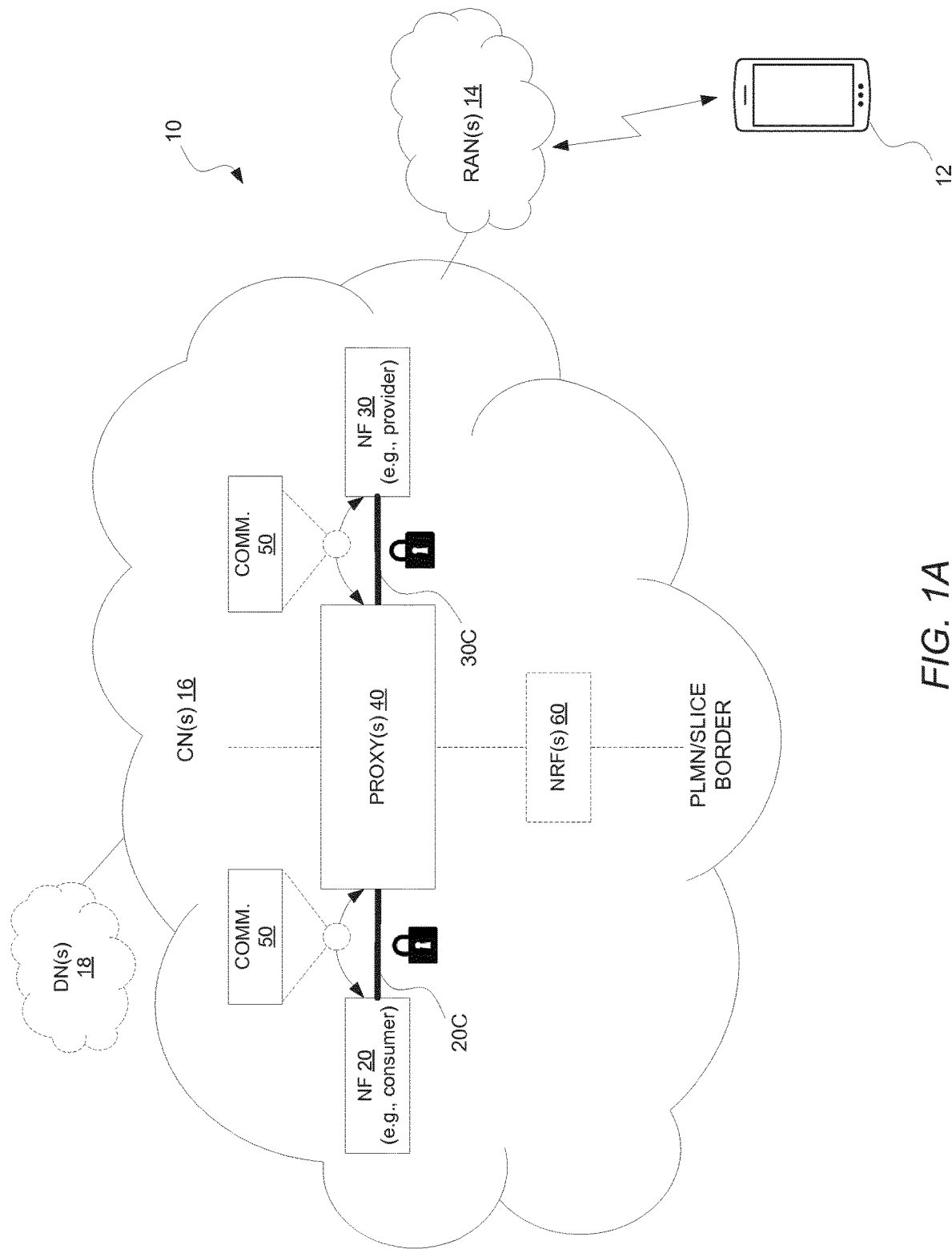
FIGS. 1A-1D are wireless communication systems illustrating to environments where embodiments presented herein can be applied.

FIG. 1A shows a wireless communication system 10 according to some embodiments. The system 10 includes one or more radio access networks (RANs) 14 that wirelessly connect wireless devices 12 to one or more core networks (CNs) 16, e.g., of one or more public land mobile networks (PLMNs). The CN(s) 16 in turn connect the wireless devices 12 to one or more data networks 18, e.g., the Internet, a public switched telephone network (PSTN), etc.

The CN(s) 16 in some embodiments have a service-based architecture that leverages service-based interactions between CN network functions (NFs), two of which are shown as NFs 20, 30. Each NF 20, 30 may be implemented by network equipment either as a network element on dedicated hardware, as a software instance running on dedicated hardware, or as a virtualized function instantiated on an appropriate platform, e.g., on a cloud infrastructure. Where the system 10 is a 5G system, for instance, NFs in the control plane may include an access and mobility management function (AMF), a session management function (SMF), a policy control function (PCF), an authentication server function (AUSF), etc.

An NF may provide its services to other authorized NFs that consume those services. An NF may thereby take on a provider role as a provider of a service (NF service provider) and/or a consumer role as a consumer of a service (NF service consumer). FIG. 1A shows that in one example NF 20 operates as NF service consumer to consume services provided by NF 30 as NF service provider. Regardless, as part of, or in order for, an NF service provider to provide its services to an NF service consumer, the NFs 20, 30 exchange communication 50.

Some embodiments herein advantageously protect this communication 50 between NFs 20, 30. Notably, embodiments protect the communication 50 in a way that enables authorized network equipment serving as one or more proxies 40 to intercept the protected communication 50, e.g., to make sure the communication 50 is not malicious, to perform load balancing, etc. This may be the case even, in some embodiments, where the NFs 20, 30 are in different PLMNs or different network slices, e.g., according to the PLMN/slice border in FIG. 1A. Where the NFs 20, 30 are in different PLMNs, for instance, the one or more proxies 40 may be edge proxies at the edge of a PLMN.

FIG. 1A more particularly shows that the one or more proxies 40 establish respective connections 20C, 30C with the NFs 20, 30. One or both of these connections 20C, 30C may be secured, e.g., based on different security credentials or information (e.g., public keys). The connections 20C, 30C may be secure in the sense that they are encrypted and have authenticated endpoints. In one example, one or both of the connections 20C, 30C are Transport Layer Security (TLS) connections. The one or more proxies 40 effectively terminate each of the connections 20C, 30C, e.g., in the sense that the connections 20C, 30C and any associated security ends with the one or more proxies 40. But the one or more proxies 40 selectively forward the communication 50 between the NFs 20, 30 over these connections 20C, 30C. In one embodiment, for example, the one or more proxies 40 may receive communication 50 from NF 30 over connection 30C that is secure and decrypt the received communication 50 using the security credentials based on which the connection 30C is secured, but may then re-encrypt the communication 50 using the security credentials based on which connection 30C is secured and transmit the encrypted communication 50 over connection 20C towards NF 20. The same may be the case for communication 50 transmitted in the other direction from NF 20 to NF 30. In this way, the one or more proxies 40 may effectively intermediate or interwork between the connections 20C, 30C and any secured associated with them.

Disposing the one or more proxies 40 in the communication path between the NFs 20, 30 and terminating the connections 20C, 30C at the one or more proxies 40 allows the one or more proxies 40 to intercept the communication 50 between the NFs 20, 30. The one or more proxies 40 may do so in order to inspect the communication 50 (e.g., in unencrypted form). Such inspection may be done for instance to determine whether the communication is valid and/or not malicious and to forward or not forward the communication 50 onward depending on that determination (e.g., forward if valid and not malicious). Alternatively or additionally, the one or more proxies 40 may intercept the communication 50 to perform load balancing or otherwise control the communication 50. Interposing the one or more proxies 40 between the NFs 20, 30 in this way may thereby protect communication 50 between those NFs 20, 30 while still guarding against malicious communication (e.g., on a PLMN or slice basis) and/or maximizing resource efficiency.

Figure 1B:
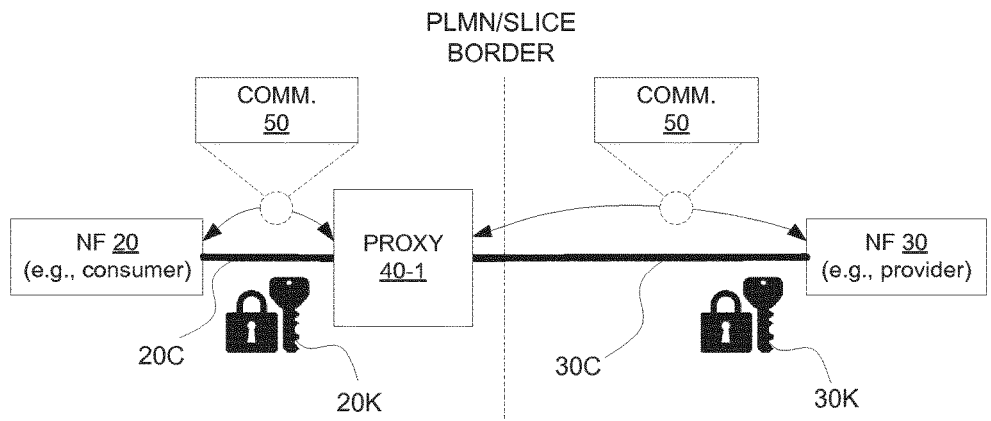
Figure 1C:
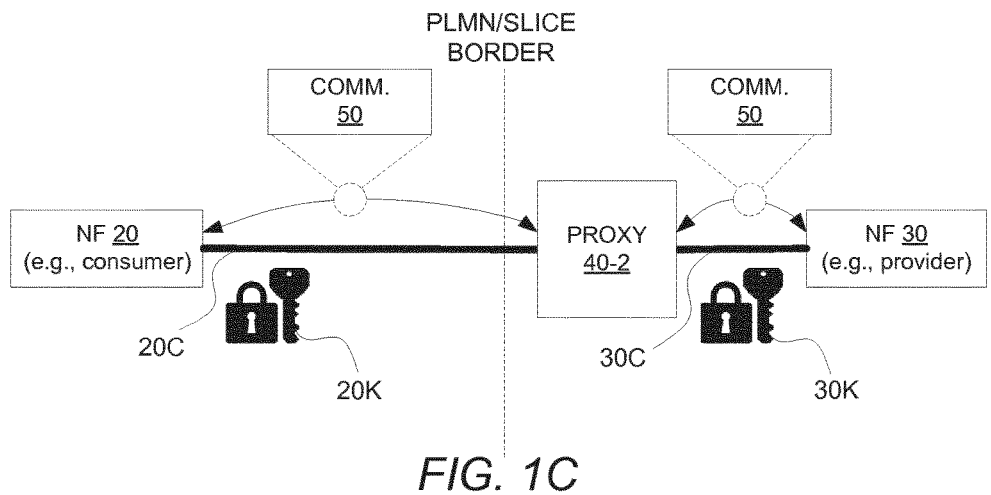
Figure 1D:
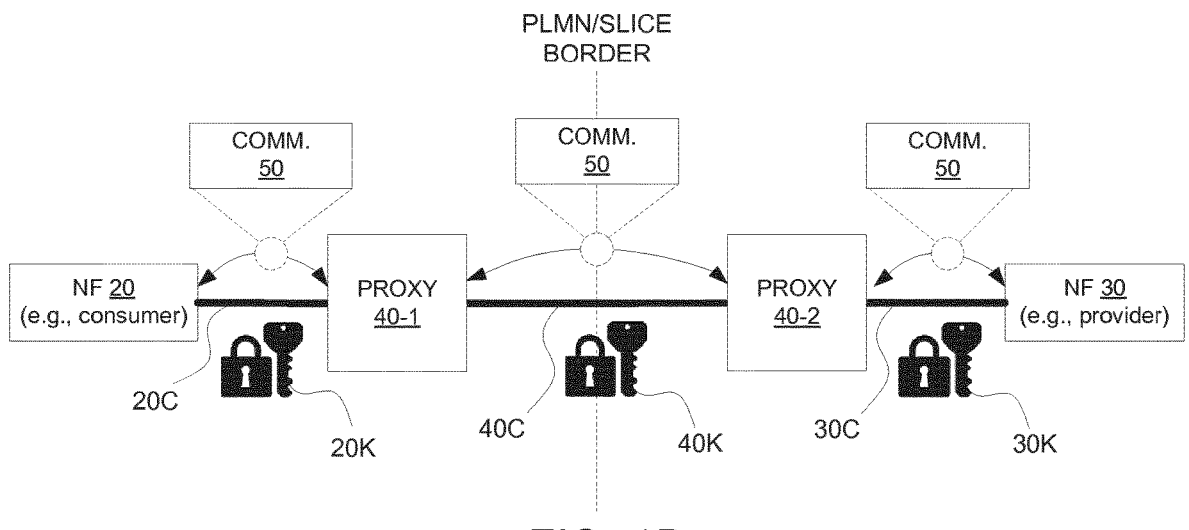

Although FIG. 1A illustrated the one or more proxies 40 collectively in terms of their combined effect when more than one proxy 40 is used, embodiments herein may employ a single proxy or multiple proxies under different configurations. FIGS. 1B-1D illustrate details of different embodiments in this regard.

As shown in FIG. 1B, a single proxy 40-1 selectively forwards communication 50 between NFs 20, 30 over connections 20C, 30C that the proxy 40-1 respectively establishes with the NFs 20, 30 directly. The proxy 40-1 in particular establishes connection 20C with NF 20. The connection 20C in some embodiments is secured, e.g., based on security information such as a public key 20K of the proxy 40-1. Establishing connection 20C with NF 20 may for instance involve the proxy 40-1 accepting an incoming connection request that the proxy 40-1 receives from NF 20. The proxy 40-1 also establishes connection 30C with NF 30. In some embodiments, the connection 30C is secured, e.g., based on different security information such as a public key 30K of NF 30. Establishing connection 30C with NF 30 by contrast may involve the proxy 40-1 transmitting an outgoing connection request to NF 30. In any event, the proxy 40-1 selectively forwards communication 50 between the NFs 20, 30 over these connections 20C, 30C. The proxy 40-1 intercepts the communication 50 that it selectively forwards between the NFs 20, 30.

In some embodiments, such as where NF 20 and proxy 40-1 are in the same PLMN or network slice as shown in FIG. 1B, proxy 40-1 serves as a proxy for NF 20, e.g., by acting on behalf of NF 20. In this role, when proxy 40-1 establishes connection 30C with NF 30, proxy 40-1 does so on behalf of NF 20. And forwarding of the communication 50 by the proxy 40-1 may involve the proxy 40-1 transmitting and/or receiving the communication 50 over connection 30C on behalf of NF 20.

In some embodiments, both connections 20C and 30C are secure. In other embodiments, connection 30C is secure, but connection 20C is not. This may be the case for instance where NF 20 and its proxy 40-1 are in the same PLMN or the same network slice, such that communication 50 over connection 20C may be assumed secure and/or trusted but that the same assumption cannot be made for communication 50 over connection 30C (since the connection 30C is an inter-PLMN or inter-slice connection).

FIG. 1C shows other embodiments where a single proxy 40-2 selectively forwards communication 50 between NFs 20, 30 over connections 20C, 30C that the proxy 40-1 respectively establishes with the NFs 20, 30 directly. The proxy 40-2 similarly establishes connection 20C with NF 20 (e.g., based on security information such as a public key 20K of the proxy 40-2) and establishes connection 30C with NF 30 (e.g., based on different security information such as a public key 30K of NF 30). This may for instance involve the proxy 40-2 accepting an incoming connection request that the proxy 40-2 receives from NF 20 and transmitting an outgoing connection request to NF 30. The proxy 40-2 selectively forwards communication 50 between the NFs 20, 30 over these connections 20C, 30C, and intercepts the communication 50 that it selectively forwards.

In the embodiments of FIG. 1C, though, the proxy 40-2 serves as a proxy for NF 30 (e.g., by acting on behalf of NF 30) rather than NF 20 as in FIG. 1B. This may be the case for instance where as shown proxy 40-2 is in the same PLMN or network slice as NF 30. In this role, when proxy 40-2 establishes connection 20C with NF 20, proxy 40-2 does so on behalf of NF 30. And forwarding of the communication 50 by the proxy 40-2 may involve the proxy 40-2 transmitting and/or receiving the communication 50 over connection 20C on behalf of NF 30.

In some embodiments, both connections 20C and 30C are secure. In other embodiments, connection 20C is secure, but connection 30C is not. This may be the case for instance where NF 30 and its proxy 40-2 are in the same PLMN or the same network slice, such that communication 50 over connection 30C may be assumed secure and/or trusted but that the same assumption cannot be made for communication 50 over connection 20C (since the connection 20C is an inter-PLMN or inter-slice connection).

FIG. 1D shows yet other embodiments where multiple proxies 40-1, 40-2 collectively forward communication 50 between NFs 20, 30. In these embodiments, proxy 40-1 establishes connection 20C with NF 20, e.g., based on security information such as a public key 20K of the proxy 40-1. This may involve the proxy 40-1 accepting an incoming connection request that the proxy 40-1 receives from NF 20. Likewise, proxy 40-2 establishes connection 30C with NF 30, e.g., based on other security information such as a public key 30K of NF 30. This may involve the proxy 40-2 transmitting an outgoing connection request to NF 30. Notably, the proxies 40-1 and 40-2 also establish connection 40C between themselves, e.g., based on yet other security information such as a public key 40K of proxy 40-2. This may involve the proxy 40-1 transmitting an outgoing connection request to proxy 40-2 and the proxy 40-2 accepting that connection request.

Proxy 40-1 thereby has connection 20C established with NF 20 and connection 40C established toward NF 30. Connection 40C may be considered to be towards NF 30 in the sense that the other endpoint of the connection 40C (namely, proxy 40-2) lies in the direction toward NF 30 along the communication path between NF 20 and NF 30. Similarly, proxy 40-2 has connection 30C established with NF 30 and connection 40C established toward NF 20.

With these connections 20C, 30C, 40C established, proxy 40-1 selectively forwards communication 50 between NFs 20, 30 over connections 20C, 40C and proxy 40-2 selectively forwards communication between NFs 20, 30 over connections 30C, 40C. Each proxy 40-1, 40-2, intercepts the communication 50 that it selectively forwards. In these embodiments, proxy 40-1 serves as a proxy for NF 20, so as to establish connection 40C on behalf of NF 20 as well as transmit and/or receive communication 50 over connection 40C on behalf of NF 20. And proxy 40-2 serves as a proxy for NF 30, so as to establish connection 40C on behalf of NF 30 as well as transmit and/or receive communication 50 over connection 40C on behalf of NF 30.

In cases where proxy 40-1 and NF 20 are in the same PLMN or network slice, and proxy 40-2 and NF 30 are in the same PLMN or network slice, this may mean that any direct inter-PLMN or inter-slice connection need only be established between the proxies 40-1, 40-2 themselves, not the NFs 20, 30. This may be in contrast to the embodiments in FIG. 1B where the NF 30 establishes an inter-PLMN or inter-slice connection with proxy 40-1 and in FIG. 1C where the NF 20 establishes an inter-PLMN or inter-slice connection with proxy 40-2.

In some embodiments, each of the connections 20C, 30C, and 40C is secure. In other embodiments, connection 40C is secure, but connections 20C and 30C are not. This may be the case for instance where NF 20 and its proxy 40-1 are in the same PLMN or the same network slice, and NF 30 and its proxy 40-2 are in the same PLMN or the same network slice, such that communication 50 over connections 20C and 30C may be assumed secure and/or trusted. But that the same assumption cannot be made for communication 50 over connection 40C (since the connection 40C is an inter-PLMN or inter-slice connection).

In any of the above embodiments, inclusion of the one or more proxies 40-1, 40-2 in the communication path between NFs 20, 30 and establishment of connections 20C, 30C, and/or 40C may be triggered and/or configured through a service discovery process by which the NF service consumer discovers a desired NF service provider. As shown in FIG. 1A, one or more network repository functions (NRFs) 60 in this regard may respond to discovery requests in a way that inserts the one or more proxies 40-1, 40-2 into the communication path between NFs 20, 30 and that facilitates establishment of the connections 20C, 30C, and/or 40C. In some embodiments, for example, an NRF 60 may receive a discovery request that requests information indicating an NF service provider (e.g., NF 30) available to provide a service to an NF service consumer (e.g., NF 20). In response to this discovery request, the NRF 60 may reply with information (e.g., an address) indicating a proxy of the NF service provider (e.g., proxy 40-2) or a proxy of the NF service consumer (e.g., proxy 40-1), e.g., instead of information indicating the NF service provider itself. The NRF 60 may also reply with security information based on which a connection (e.g., connection 20C, 30C, or 40C) with the indicated proxy is to be secured. The security information may be for instance the public key (PK) of the indicated proxy (e.g., 20K or 40K).

In fact, in some embodiments, the insertion of one or more proxies 40 by the one or more NRFs 60 may remain transparent or at least irrelevant to the NFs 20, 30. For example, the NFs 20, 30 may connect to a proxy 40 in the same way or using the same protocol as when connecting with another NF, meaning that the NFs 20, 30 may not distinguish or care whether they are connecting to each other directly or connecting to each other indirectly via one or more proxies 40.

Figure 2B:
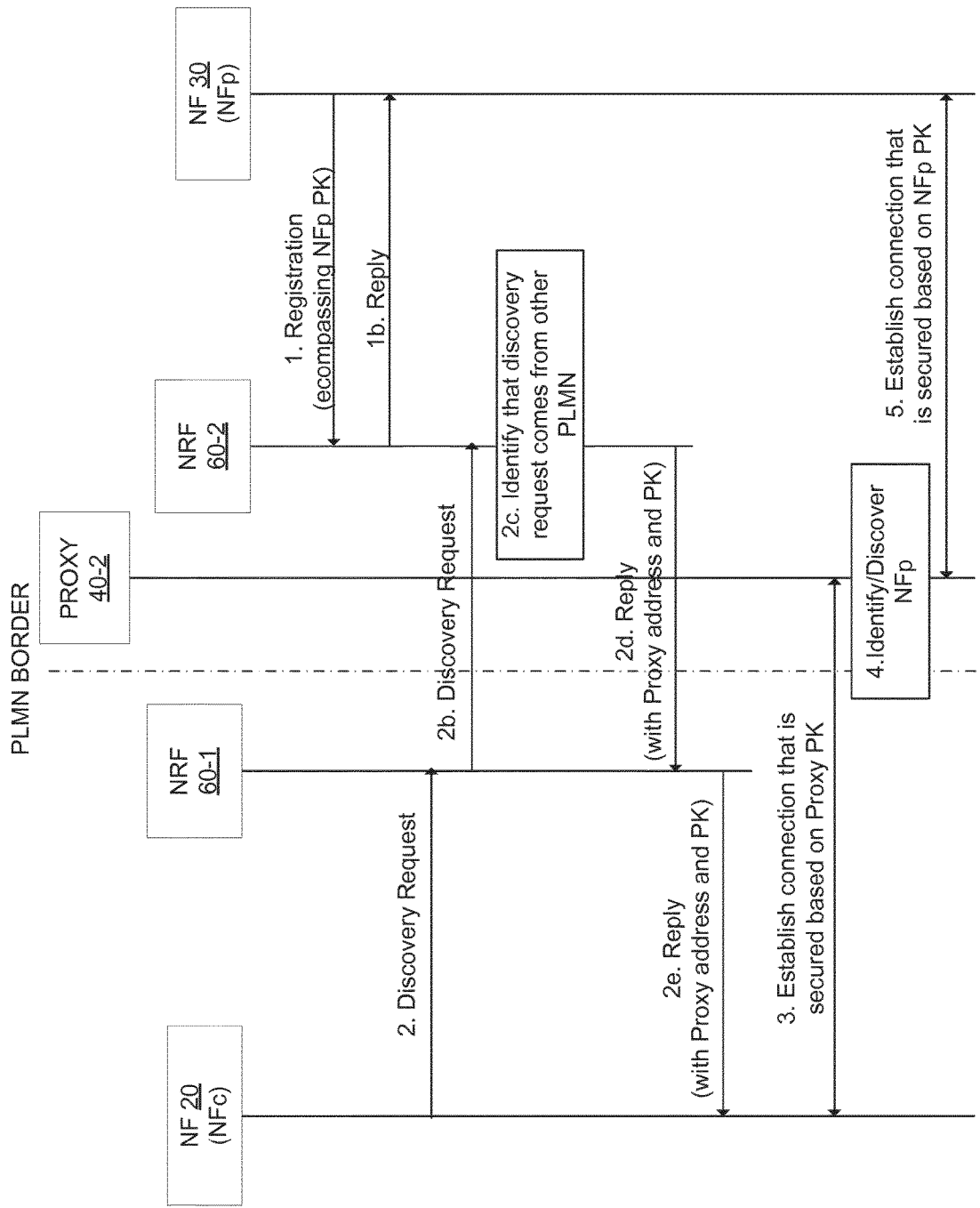

FIGS. 2A-2D illustrate additional details of embodiments for configuring one or more proxies 40 to be included in the NF communication path through the service discovery process, in a context where the NFs 20, 30 are in different PLMNs, the one or more proxies 40 are edge proxies, and each connection is secure. As shown in FIG. 2A, for example, NF 30 as an NF service provider (NFp) performs registration (Step 1) to an NRF 60-2 in its local PLMN, so that NRF 60-2 becomes aware that the NFp exists. The registration may encompass the NFp sending its public key (PK) to the NRF 60-2, at which point the NRF 60-2 replies (Step 1b) so as to acknowledge NFp's registration. Meanwhile, NF 20 as an NF service consumer (NFc) sends a discovery request (Step 2) to an NRF 60-1 in its local PLMN requesting discovery of a certain service or type of NF. NRF 60-1 receives the discovery request and identifies that NFc is requesting discovery of an NFp in another PLMN. Accordingly, rather than replying with the address and public key of an NFp in the local PLMN, NRF 60-1 replies with an address (e.g., IP address) and public key of proxy 40-1 (Step 2c). The NFc correspondingly sends a connection request to the returned address (of proxy 40-1) and establishes a connection with proxy 40-1 that is secured based on the returned public key (Step 3). The proxy 40-1 similarly establishes the connection with NFc, e.g., by accepting the connection request.

Proxy 40-1 then identifies and/or discovers the NFp providing the service that NFc desires to consume (Step 4). Proxy 40-1 may identify and/or discover the NFp in any number of ways. In one embodiment, for example, proxy 40-1 identifies the NFp from the connection request received from the NFc, e.g., based on a port on which the request is received. For instance, connection requests may be received on different ports for different NF service providers. In another embodiment, by contrast, proxy 40-1 may receive over the secure connection with NFc an application layer request (e.g., HTTP request) from which the proxy 40-1 identifies the NFp. For instance, proxy 40-1 may identify the NFp using a request identifier that is encoded in the address of the application layer request and that identifies the discovery request made by or on behalf of the NFc to NRF 60-1. In this case, the NRF 60-1 has bound the address of the application layer request to the request identifier as a reference to the discovery request. The proxy 40-1 may transmit a request to the NRF 60-1 that includes the request identifier and receive a response that identifies the NFp. The response may further include the public key of the NFp. In still other embodiments, the NRF 60-1 proactively discovers NFp from NRF 60-2 and then informs proxy 40-1 that NFc will try to connect to NFp along with the address and public key of NFp. Alternatively, the proxy 40-1 may determine from the application layer request a type of NF with which the NFc requests to communicate and may perform discovery to discover the NFp as being an NF of that type. In still other embodiments, proxy 40-1 may be preconfigured to know which NFp a given NFc will contact and may use this knowledge to discover the NFp.

In any event, after proxy 40-1 discovers NFp, proxy 40-1 establishes a connection with NFp that is secured based on the public key of NFp (Step 5). Having established connections with NFc and NFp, proxy 40-1 may then selectively forward communication between the NFs and intercept that communication as needed. This may include forwarding any communication received in Step 3.

In FIG. 2A, the proxy 40-1 handles inter-PLMN communication on behalf of NF 20 as the NFc, e.g., based on a connection request sent from the proxy's PLMN to the NFp. In FIG. 2B, by contrast, proxy 40-2 handles inter-PLMN communication on behalf of NF 30 as the NFp, e.g., based on a connection request received by the proxy's PLMN from the NFp.

More particularly in this regard, when NRF 60-1 receives the discovery request from NFc, NRF 60-1 in turn transmits a discovery request to NRF 60-2 (Step 2b). NRF 60-2 identifies that the discovery request comes from a different PLMN (Step 2c), so NRF 60-2 replies with an address (e.g., IP address) and public key of proxy 40-2 in its local PLMN (Step 2d). NRF 60-1 in turn replies to the NFc's discovery request with the address and public key of proxy 40-2. FIG. 2B then proceeds similarly as in FIG. 2A, but with proxy 40-2 in place of proxy 40-1. In particular, the NFc establishes a connection with proxy 40-2 that is secured based on the public key of proxy 40-2 (Step 3) and after discovering NFp (Step 4), proxy 40-2 establishes a connection with NFp that is secured based on the public key of NFp (Step 5).

Figure 2C:
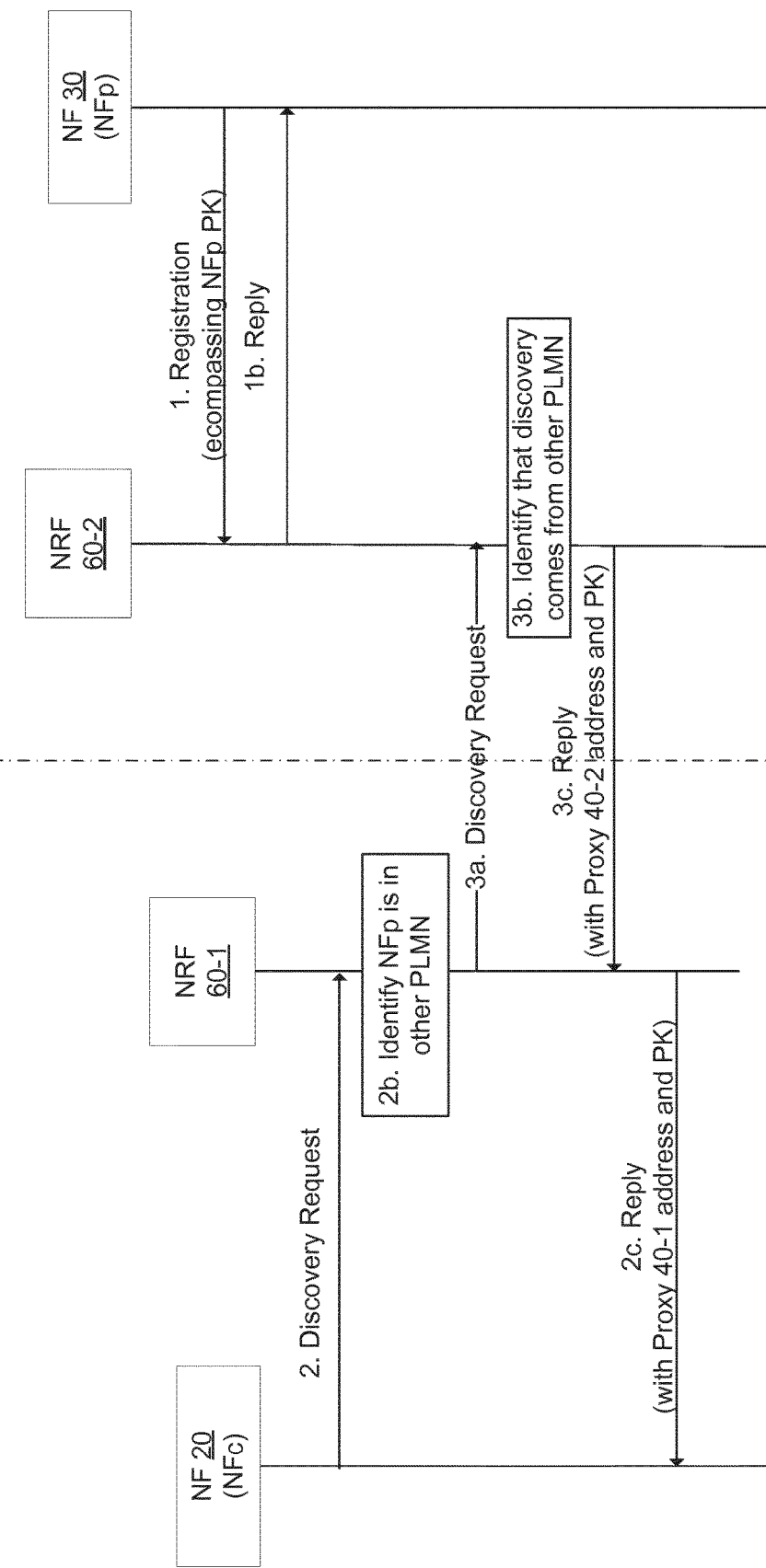
Figure 2D:
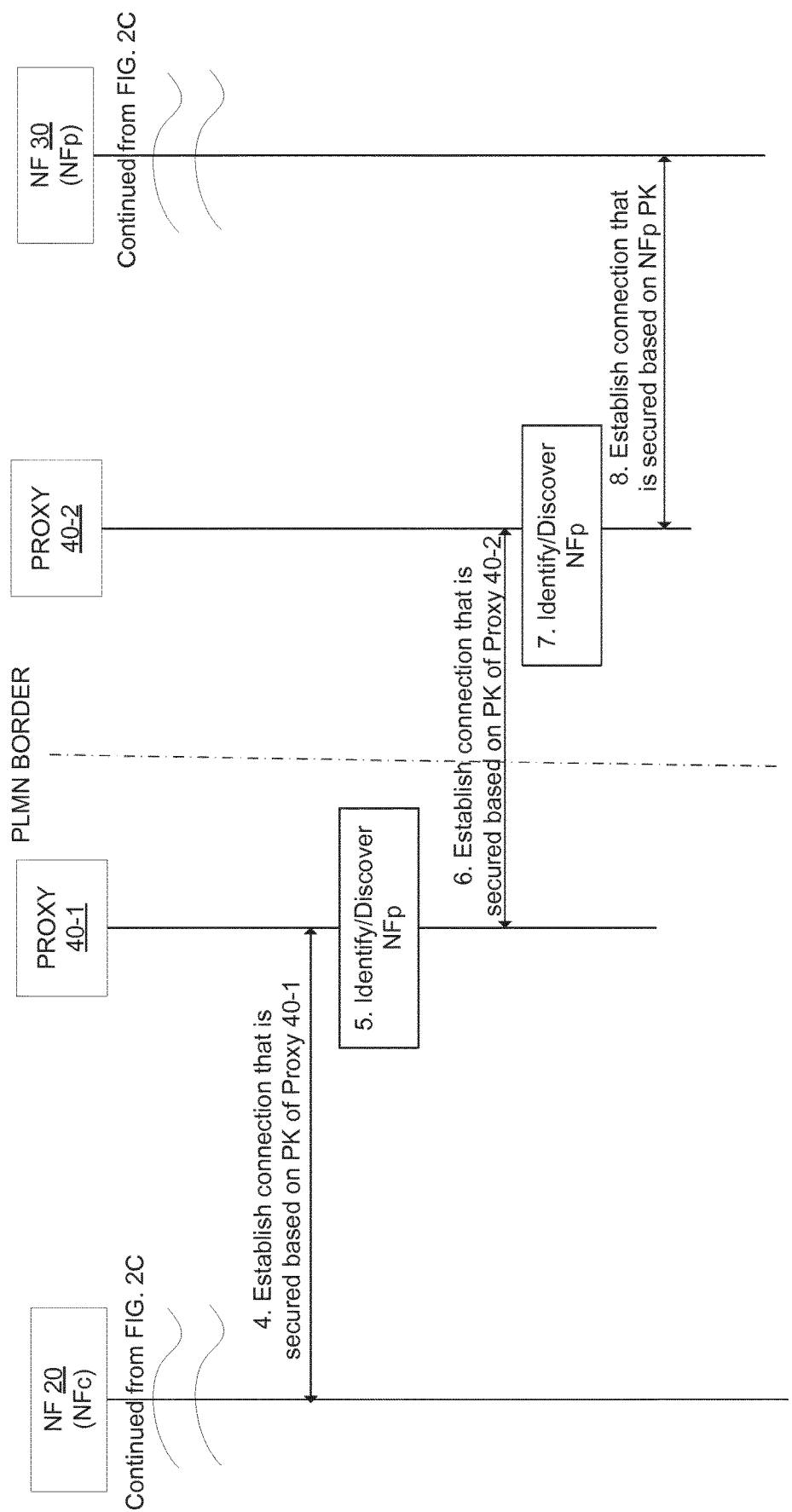

FIGS. 2C-2D illustrate additional details of other embodiments for configuring multiple proxies 40-1, 40-2 to be included in the NF communication path through the service discovery process. In these embodiments, when NRF 60-1 receives the discovery request from NFc, NRF 60-1 identifies that the NFp is in another PLMN (Step 2b in FIG. 2C) and in turn transmits a discovery request to NRF 60-2 (Step 3a). NRF 60-2 identifies that the discovery request comes from a different PLMN (Step 3b in FIG. 2C), so NRF 60-2 replies with an address (e.g., IP address) and public key of proxy 40-2 in its local PLMN (Step 3c in FIG. 2C). Rather than returning to the NFc the address and public key of a proxy 40-2 in a different PLMN, though, NRF 60-1 replies to the NFc's discovery request with the address and public key of a proxy 40-1 in its local PLMN.

Based on this reply, the NFc establishes a connection with proxy 40-1 that is secured based on the public key of proxy 40-1 (Step 4 in FIG. 2D). Proxy 40-1 then determines the endpoint to which it is to connect on behalf of NFc (Step 5 in FIG. 2D). In some embodiments, from the perspective of proxy 40-1, the proxy 40-1 may seek to identify and/or discover the NFp from which the NFc desires to consume a service, in order to connect to that NFp, but the identification and/or discovery unbeknownst to proxy 40-1 may actually prompt the proxy 40-1 to connect to the proxy 40-2 of NFp. That is, proxy 40-1 may believe or operate as if it is identifying and/or discovering NFp, but it actually identifies and/or discovers proxy 40-2. This may happen in any number of ways.

In one embodiment, for example, proxy 40-1 may receive over the connection with NFc an application layer request (e.g., HTTP request) whose address encodes a request identifier that identifies the discovery request made by or on behalf of the NFc to NRF 60-1. In this case, the NRF 60-1 has bound the address of the application layer request to the request identifier as a reference to the discovery request. The proxy 40-1 may transmit a request to the NRF 60-1 that includes the request identifier and receive a response that includes the address of proxy 40-2 (e.g., instead of or in place of the address of NFp). The response may further include the public key of proxy 40-2 (e.g., instead of or in place of the public key of NFp).

In still other embodiments, the NRF 60-1 informs proxy 40-1 that when the NFc connects to proxy 40-1, the proxy 40-1 is to connect to proxy 40-2, e.g., by informing proxy 40-1 of the address and public key of proxy 40-2. In still other embodiments, proxy 40-1 may be preconfigured to know to connect to proxy 40-2 on behalf of a given NFc. Similarly, in another embodiment, proxy 40-1 may connect to proxy 40-2 when it receives a certain connection request from the NFc, e.g., when it receives a connection request on a certain port.

Regardless, proxy 40-1 establishes a connection with proxy 40-2 that is secured based on a public key of proxy 40-2 (Step 6 in FIG. 2D). Proxy 40-2 in turn identifies and/or discovers NFp (Step 7 in FIG. 2D), e.g., in any of the ways described with respect to FIG. 2B such as by transmitting a request identifier to NRF 60-2 and receiving in response the address and public key of NFp. Proxy 40-2 then establishes a connection with NFp that is secured based on the public key of NFp (Step 8 in FIG. 2D). With these connections established, proxy 40-1 selectively forwards communication 50 between NFs 20, 30 over its connections and proxy 40-2 selectively forwards communication between NFs 20, 30 over its connections as described above.

Note that Steps 3a-3c in FIGS. 2C-2D may occur at any point between Step 2b and Step 5. Step 3a-3c may also be considered as part of Step 5.

In any of the embodiments in FIGS. 2A-2D, the NFc and NFp may each believe or operate as if connecting directly with each other, i.e., the insertion of one or more proxies 40-1, 40-2 in their communication path may be transparent to them. Similarly, in some embodiments, each of the proxies 40-1, 40-2 may believe or operate as if connecting directly with the other NF for which it does not serve as a proxy (e.g., as if it is the only proxy involved). So, for instance, proxy 40-1 in FIG. 2D may believe or operate as if it is connecting directly with NFp rather than indirectly via proxy 40-2.

Note that although the above embodiments assumed that intra-PLMN connections are also secured (e.g., encrypted), such is not the case in other embodiments. Accordingly, in some embodiments, an NRF 60-1 or 60-2 may signal (e.g., in response to a discovery request) that the connection with the indicated proxy or NFp is not to be secured (e.g., encrypted). Such may be signaled for instance implicitly based on whether security information is returned with the discovery request reply.

In view of the above, some embodiments herein generally secure communication between NFs in separate PLMNs while still allowing edge-proxies to intercept (e.g., for inspection and perhaps modification) communication that passes into and out of the PLMN. This may be done by terminating security, transparently to the NFc, at an edge-proxy while the edge-proxy in turn terminates the security at the NFp or a proxy of the NFp. This may be in contrast to simply providing the NFc with the public key of NFp, as this would not allow an edge-proxy to intercept and inspect the communication and would otherwise not have enough control over the communication. In fact, each PLMN in some embodiments have edge-proxies that are able to intercept communication between NFs to ensure that it is valid and not malicious. In these and other embodiments, an NRF may aid an intermediate node such as an edge-proxy to intercept traffic between two NFs. Alternatively or additionally, some embodiments allow NFs in separate PLMNs to have the same security behavior as NFs within the same PLMN.

Note that in some embodiments, a public key may refer to a raw public key whereas in other embodiments a public key refers to a raw public key combined with a certificate that binds this public key to the address of the node having access to the private key for the public key.

Note also that in some embodiments a proxy 40 may be configured to unconditionally forward communication 50 instead of selectively forwarding that communication 50. The proxy 40 may for instance still inspect the forwarded communication for whether it is malicious but simply log the inspection result and/or trigger an alarm based on the inspection result.

Note further that embodiments herein may use any of one or more communication protocols known in the art or that may be developed, such as IEEE 802.xx, Code Division Multiple Access (CDMA), Wideband CDMA (WCDMA), Global System for Mobile telecommunications (GSM), Long Term Evolution (LTE), WiMax, New Radio (NR), or the like. Accordingly, although sometimes described herein in the context of 5G, the principles and concepts discussed herein are applicable to 4G systems and others.

A wireless device as used herein is any type device capable of communicating with another radio node wirelessly over radio signals. A wireless device may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless device may be referred to as a UE, it should be noted that the wireless device does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

As used herein, "network equipment" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, core network equipment in a core network (e.g., equipment that implements an AMF or SMF).

Figure 3:
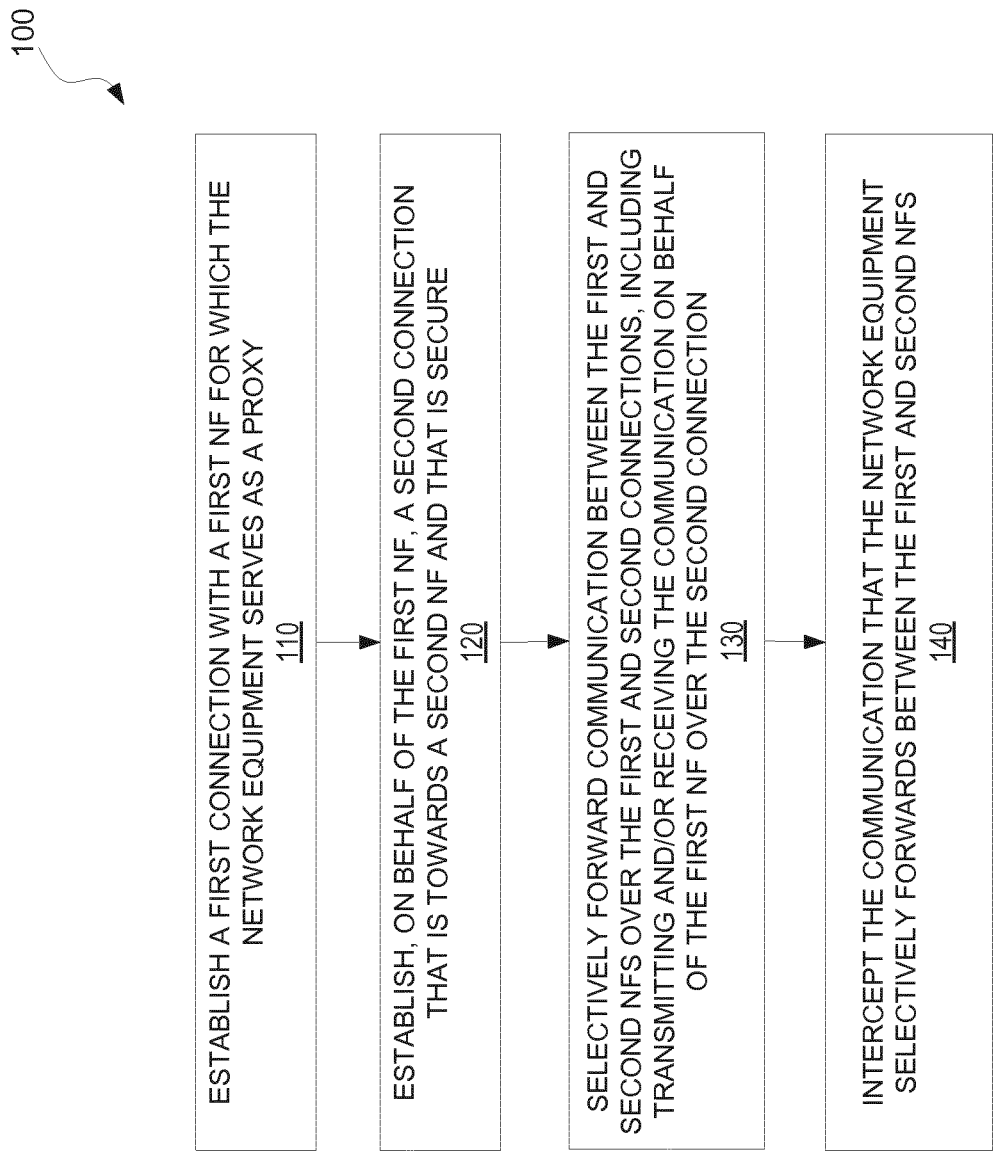
FIG. 3 is a flow chart illustrating a method for embodiments presented herein.

In view of the above variations and modifications, network equipment in some embodiments generally performs the method 100 shown in FIG. 3. The method may be performed by the network equipment for intercepting protected communication 50 between core network, CN, network functions, NFs 20, 30. The method 100 as shown includes establishing a first connection with a first NF for which the network equipment serves as a proxy (Block 110). The method 100 may also include establishing, on behalf of the first NF, a second connection that is towards a second NF and that is secure (Block 120). The method 100 may further include selectively forwarding communication between the first and second NFs over the first and second connections, including transmitting and/or receiving the communication on behalf of the first NF over the second connection (Block 130). The method 100 may also include intercepting the communication that the network equipment selectively forwards between the first and second NFs (Block 140).

With reference to FIG. 1B, for instance, the method 100 may be performed by network equipment that implements proxy 40-1. In this case, the method 100 may involve the network equipment establishing connection 20C with NF 20 for which the network equipment serves as a proxy, and establishing on behalf of NF 20 connection 30C that is towards NF 30 and that is secure. The method 100 may further involve the network equipment selectively forwarding communication 50 between the NFs 20, 30 over the connections 20C, 30C, including transmitting and/or receiving the communication 50 on behalf of NF 20 over connection 30C. The method 100 may also include the network equipment intercepting the communication 50 that the network equipment selectively forwards between the NFs 20, 30.

With reference to FIG. 1C, by contrast, the method 100 may be performed by network equipment that implements proxy 40-2. In this case, the method 100 may involve the network equipment establishing connection 30C with NF 30 for which the network equipment serves as a proxy, and establishing on behalf of NF 30 connection 20C that is towards NF 20 and that is secure. The method 100 may further involve the network equipment selectively forwarding communication 50 between the NFs 20, 30 over the connections 20C, 30C, including transmitting and/or receiving the communication 50 on behalf of NF 30 over connection 20C. The method 100 may also include the network equipment intercepting the communication 50 that the network equipment selectively forwards between the NFs 20, 30.

Still further, with reference to FIG. 1D, the method 100 may be performed in separated instances by both network equipment that implements proxy 40-1 and network equipment that implements proxy 40-2.

In particular, with respect to proxy 40-1, the method may involve network equipment that implements proxy 40-1 establishing connection 20C with NF 20 for which the network equipment serves as a proxy, and establishing on behalf of NF 20 connection 40C that is towards NF 30 and that is secure. The method 100 may further involve the network equipment selectively forwarding communication 50 between the NFs 20, 30 over the connections 20C, 40C, including transmitting and/or receiving the communication 50 on behalf of NF 20 over connection 40C. The method 100 may also include the network equipment intercepting the communication 50 that the network equipment selectively forwards between the NFs 20, 30.

With respect to proxy 40-2, the method may involve network equipment that implements proxy 40-2 establishing connection 30C with NF 30 for which the network equipment serves as a proxy, and establishing on behalf of NF 30 connection 40C that is towards NF 20 and that is secure. The method 100 may further involve the network equipment selectively forwarding communication 50 between the NFs 20, 30 over the connections 20C, 40C, including transmitting and/or receiving the communication 50 on behalf of NF 30 over connection 40C. The method 100 may also include the network equipment intercepting the communication 50 that the network equipment selectively forwards between the NFs 20, 30.

Although not shown in FIG. 3, the method may further include inspecting the intercepted communication, e.g., to determine whether the communication is valid and/or not malicious. Determining whether the communication is valid may involve for instance checking that only correct HTTP headers are used, that a JSON message is correctly encoded, etc. Determining whether the communication is malicious may involve for instance checking if suspicious data is being transmitted (e.g., as indicated by a JSON message being very large, a message containing shellcode, etc.). Regardless, where such inspection is performed, selectively forwarding the communication may involve forwarding or not forwarding depending on that inspection.

Figure 4:
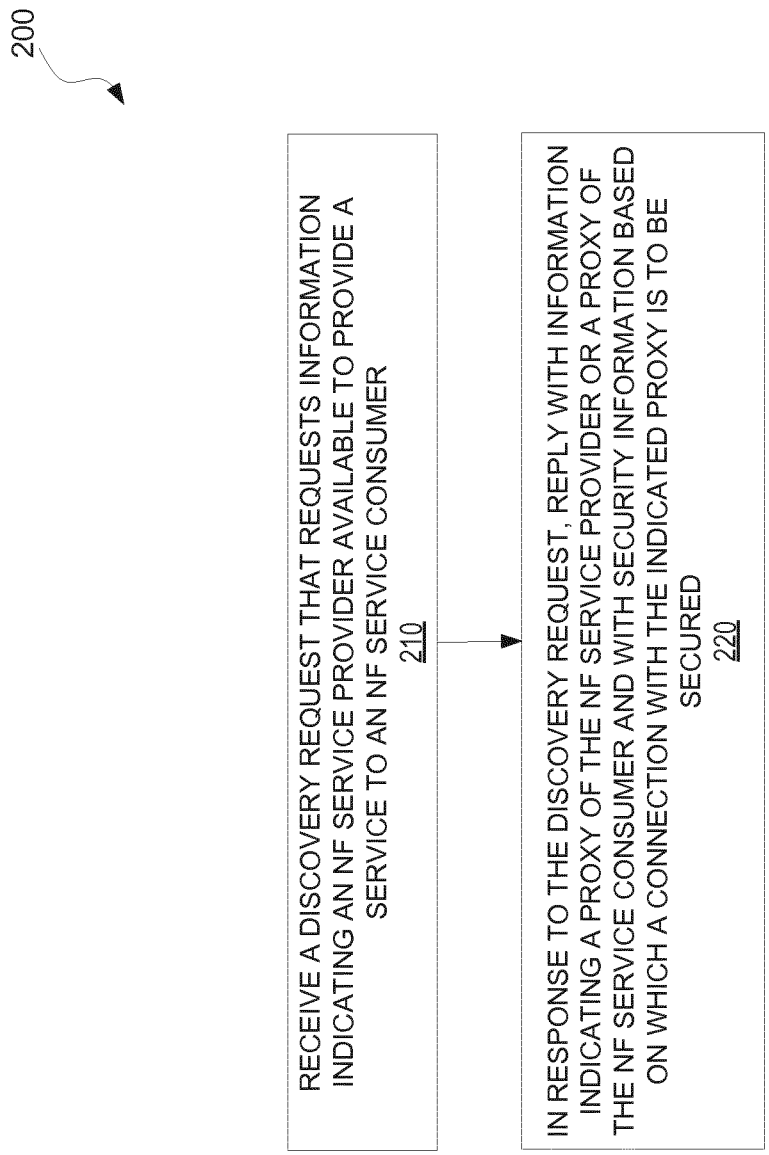
FIG. 4 is another flow chart illustrating a method for other embodiments presented herein.

Also in view of the above variations and modifications, network equipment in other embodiments generally performs the method 200 shown in FIG. 4. The method 200 may be performed by the network equipment for facilitating interception of protected communication between core network (CN) network functions (NFs). The method 200 as shown in this regard includes receiving a discovery request that requests information indicating an NF service provider available to provide a service to an NF service consumer (Block 210). The method 200 may also include, in response to the discovery request, replying with information indicating a proxy of the NF service provider or a proxy of the NF service consumer and with security information based on which a connection with the indicated proxy is to be secured.

With reference to FIG. 2A, for instance, the method 200 may be performed by network equipment that implements NRF 60-1. In this case, the method 200 may involve the network equipment receiving the discovery request from NFc in Step 2 and, in response to that discovery request, replying with information indicating the proxy 40-1 of the NFc (e.g., the address of proxy 40-1) and with the public key of that proxy 40-1.

With reference to FIG. 2B, by contrast, the method 200 may be performed in separate instances by both network equipment that implements NRF 60-1 and by network equipment that implements NRF 60-2. In the former case, the method 200 may involve the network equipment receiving a discovery request from NFc in Step 2 and, in response to that discovery request, replying in Step 2e with information indicating the proxy 40-2 of the NFp (e.g., the address of proxy 40-2) and with the public key of that proxy 40-2. In the latter case, the method 200 may involve the network equipment receiving a discovery request from NRF 60-1 in Step 2b and, in response to that discovery request, replying in Step 2d with information indicating the proxy 40-2 of the NFp (e.g., the address of proxy 40-2) and with the public key of that proxy 40-2.

Still further, with reference to FIGS. 2C-2D, the method 200 may be performed in separated instances by both network equipment that implements NRF 60-1 and by network equipment that implements NRF 60-2. In the former case, the method 200 may involve the network equipment receiving a discovery request from NFc in Step 2 and, in response to that discovery request, replying in Step 2c with information indicating the proxy 40-1 of the NFc (e.g., the address of proxy 40-1) and with the public key of that proxy 40-1. In the latter case, the method 200 may involve the network equipment receiving a discovery request from NRF 60-1 in Step 3a and, in response to that discovery request, replying in Step 3c with information indicating the proxy 40-2 of the NFp (e.g., the address of proxy 40-2) and with the public key of that proxy 40-2.

Note that the network equipment as described above may perform any of the processing herein by implementing any functional means or units. In one embodiment, for example, the network equipment comprises respective circuits or circuitry configured to perform the steps shown in FIG. 3 and/or FIG. 4. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 5A:
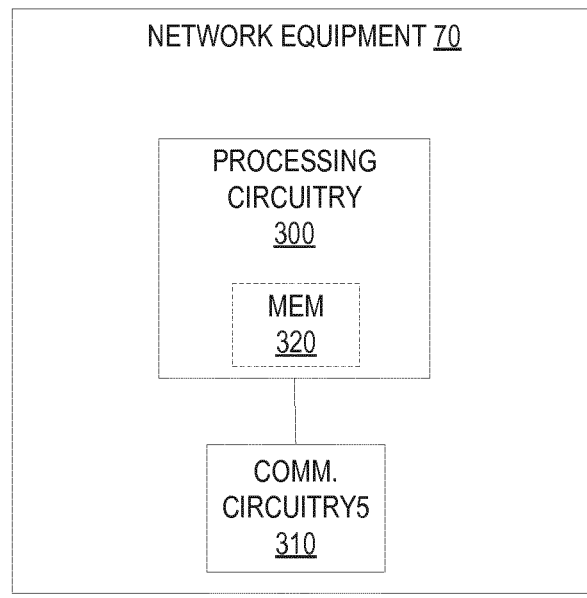
FIGS. 5A-5C are schematic diagrams illustrating some components/function modules of devices presented herein.

FIG. 5A illustrates network equipment 70 in accordance with one or more embodiments. As shown, the network equipment 70 includes processing circuitry 300 and communication circuitry 310. The communication circuitry 310 is configured to transmit and/or receive information to and/or from one or more other nodes, e.g., via any communication technology. The processing circuitry 300 is configured to perform processing described above, e.g., in FIG. 3 and/or FIG. 4, such as by executing instructions stored in memory 320. The processing circuitry 300 in this regard may implement certain functional means, units, or modules.

Figure 5B:
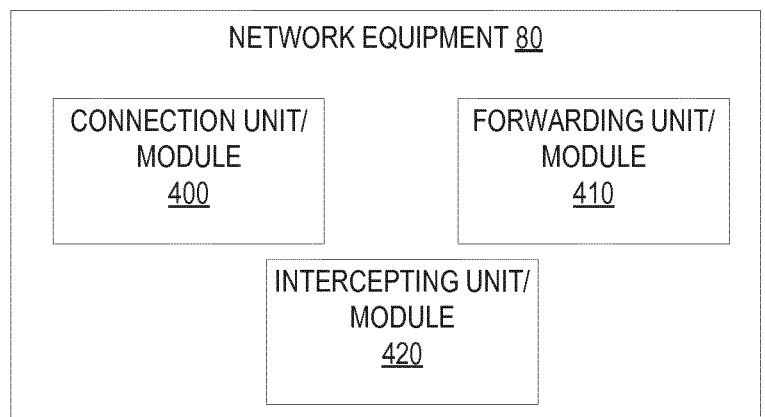

FIG. 5B illustrates network equipment 80 in accordance with one or more other embodiments. As shown, the network equipment 80 implements various functional means, units, or modules, e.g., via the processing circuitry 300 in FIG. 5A and/or via software code. These functional means, units, or modules, e.g., for implementing the method in FIG. 3, include for instance a connection unit or module 400 for establishing a first connection with a first NF for which the network equipment serves as a proxy and for establishing, on behalf of the first NF, a second connection that is towards a second NF and that is secure. Also included is a forwarding unit or module 410 for selectively forwarding communication between the first and second NFs over the first and second connections, including transmitting and/or receiving the communication on behalf of the first NF over the second connection. Further included is an intercepting unit or module 420 for intercepting the communication that the network equipment selectively forwards between the first and second NFs.

Figure 5C:
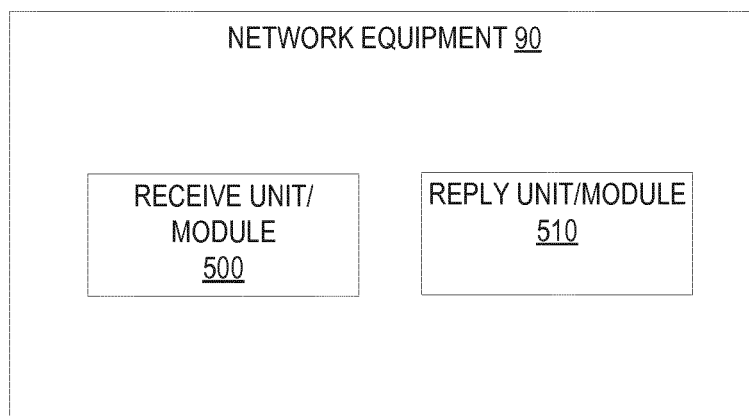

FIG. 5C illustrates network equipment 90 in accordance with one or more other embodiments. As shown, the network equipment 90 implements various functional means, units, or modules, e.g., via the processing circuitry 300 in FIG. 5A and/or via software code. These functional means, units, or modules, e.g., for implementing the method in FIG. 4, include for instance a receive unit or module 500 for receiving a discovery request that requests information indicating an NF service provider available to provide a service to an NF service consumer. Also included is a reply unit or module 510 for, in response to the discovery request, replying with information indicating a proxy of the NF service provider or a proxy of the NF service consumer and with security information based on which a connection with the indicated proxy is to be secured.

Those skilled in the art will also appreciate that embodiments herein further include corresponding computer programs.

A computer program comprises instructions which, when executed on at least one processor of network equipment, cause the network equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a non-transitory computer readable (storage or recording) medium that has stored thereon instructions that, when executed by a processor of a network equipment, cause the network equipment to perform as described above.

APPENDIX

Authentication Between Network Functions:

NF should authorize requests. To be able to do authorization there should be explicit authentication in at least one direction. For example, if an authorization token is used by a NF Consumer, the NF Consumer must be able to ensure that this authorization token is not sent to a malicious MITM.

It is proposed herein that for any solution chosen, the NRF shall be able to aid the NF Consumer in authenticating the NF Provider. This makes sense as the NRF will either, in the case of the same PLMN, a direct way of authenticating the NF Provider, or in the case of separate PLMNs, an indirect way of authenticating the NF Provider. The indirect way referred to is through the authenticated neighboring NRF.

If a solution that allows certificates and PKI is chosen, it is still useful to allow the NRF to aid the authentication if necessary. The authentication could in that case also be based on trusted root certificates and certificate chains.

For pre-configured discovery the NF Consumer is provisioned with credentials used to authenticate the NF Producer. In case of discovery through the NRF the NF Producer provides credentials for authentication of the NF Producer to the NRF. During discovery the NRF provides these credentials to the NF Consumer.

The following are certain enumerated embodiments further illustrating various aspects the disclosed subject matter:

1. A method performed by network equipment in a core network for intercepting protected communication between core network, CN, network functions, NFs, the method comprising:
establishing a first connection with a first NF for which the network equipment serves as a proxy;
establishing, on behalf of the first NF, a second connection that is towards a second NF and that is secure;
selectively forwarding communication between the first and second NFs over the first and second connections, including transmitting and/or receiving the communication on behalf of the first NF over the second connection; and
intercepting the communication that the network equipment selectively forwards between the first and second NFs.

2. The method of embodiment 1, wherein the first and second NFs are in different public land mobile networks, PLMNs.

3. The method of embodiment 1, wherein the first and second NFs are in different network slices.

4. The method of any of embodiments 1-3, wherein the first connection is secure.

5. The method of any of embodiments 1-4, wherein the second connection is secured with either a public key of the second NF or a public key of different network equipment serving as a proxy for the second NF.

6. The method of any of embodiments 1-5, wherein the first NF is an NF service consumer and the second NF is an NF service provider.

7. The method of embodiment 6, wherein the first connection is secure, wherein the first connection is secured with a public key of the network equipment.

8. The method of any of embodiments 1-5, wherein the first NF is an NF service provider and the second NF is an NF service consumer.

9. The method of embodiment 8, wherein the first connection is secure, wherein the first connection is secured with a public key of the NF service provider.

10. The method of any of embodiments 6-9, further comprising receiving a connection request from the NF service consumer or a proxy of the NF service consumer and identifying from the connection request the NF service provider with which the NF service consumer requests to communicate.

11. The method of embodiment 10, comprising identifying the NF service provider based on a port on which the connection request is received.

12. The method of any of embodiments 6-9, further comprising receiving, over the first or second connection, an application layer request from the NF service consumer or a proxy of the NF service consumer and identifying from the application layer request the NF service provider with which the NF service consumer requests to communicate.

13. The method of embodiment 12, comprising identifying the NF service provider using a request identifier that is encoded in an address of the application layer request and that identifies a discovery request made by or on behalf of the NF service consumer to a network repository function (NRF) for discovering the NF service provider.

14. The method of embodiment 13, comprising transmitting a request to the NRF that includes the request identifier and receiving a response that identifies the NF service provider.

15. The method of embodiment 12, comprising determining from the application layer request a type of NF with which the NF service consumer requests to communicate and discovering the NF service provider as being an NF of that type.

16. The method of any of embodiments 6-9, further comprising receiving from a network repository function (NRF) information identifying the NF service provider as the NF with which the NF service consumer requests to communicate.

17. The method of any of embodiments 1-16, wherein the network equipment is a core network edge proxy.

18. The method of any embodiments 1-17, further comprising inspecting the intercepted communication to determine whether the communication is valid and/or not malicious and wherein the selectively forwarding comprises forwarding or not forwarding depending on said determination.

19. The method of any of embodiments 1-18, wherein the core network is a 5G core network.

20. The method of any of embodiments 1-19, wherein the first connection is secured with encryption and/or the second connection is secured with encryption.

21. A method performed by network equipment in a core network for facilitating interception of protected communication between core network (CN) network functions (NFs), the method comprising:
receiving a discovery request that requests information indicating an NF service provider available to provide a service to an NF service consumer; and
in response to the discovery request, replying with information indicating a proxy of the NF service provider or a proxy of the NF service consumer and with security information based on which a connection with the indicated proxy is to be secured.

22. The method of embodiment 21, wherein the first and second NFs are in different public land mobile networks, PLMNs.

23. The method of embodiment 21, wherein the first and second NFs are in different network slices.

24. The method of any of embodiments 21-23, wherein the security information includes a public key of the indicated proxy.

25. The method of any of embodiments 21-24, wherein the information indicating a proxy of the NF service provider or a proxy of the NF service consumer indicates an address of the proxy of the NF service provider or an address of the proxy of the NF service consumer.

26. The method of embodiment 25, wherein the indicated address encodes a request identifier that identifies the discovery request.

27. The method of embodiment 26, comprising receiving a request from the indicated proxy that includes the request identifier and transmitting a response that identifies the NF service provider.

28. The method of any of embodiments 21-25, further comprising transmitting to the indicated proxy information identifying the NF service provider as the NF with which the NF service consumer requests to communicate.

29. The method of any of embodiments 21-28, comprising replying with information indicating the proxy of the NF service provider.

30. The method of any of embodiments 21-28, comprising replying with information indicating the proxy of the NF service consumer.

31. The method of any of embodiments 21-30, wherein the core network is a 5G core network.

32. The method of any of embodiments 21-31, wherein the connection is to be secured with encryption using the security information.

33. Network equipment configured for use in a core network for intercepting protected communication between core network, CN, network functions, NFs, the network equipment configured to:
  establish a first connection with a first NF for which the network equipment serves as a proxy;
  establish, on behalf of the first NF, a second connection that is towards a second NF and that is secure;
  selectively forward communication between the first and second NFs over the first and second connections, including transmitting and/or receiving the communication on behalf of the first NF over the second connection; and
  intercept the communication that the network equipment selectively forwards between the first and second NFs.

34. The network equipment of embodiment 33, configured to perform the method of any of embodiments 2-20.

35. Network equipment configured for use in a core network for facilitating interception of protected communication between core network (CN) network functions (NFs), the network equipment configured to:
  receive a discovery request that requests information indicating an NF service provider available to provide a service to an NF service consumer; and
  in response to the discovery request, reply with information indicating a proxy of the NF service provider or a proxy of the NF service consumer and with security information based on which a connection with the indicated proxy is to be secured.

36. The network equipment of embodiment 35, configured to perform the method of any of embodiments 22-32.

37. A computer program comprising instructions which, when executed by at least one processor of network equipment, causes the network equipment device to perform the method of any of embodiments 1-32.

38. A carrier containing the computer program of embodiment 37, wherein the carrier is one of an electronic signal, optical signal, radio signal, or computer readable storage medium.

39. Network equipment configured for use in a core network for intercepting protected communication between core network, CN, network functions, NFs, the network equipment comprising:
  processing circuitry and memory, the memory containing instructions executable by the processing circuitry wherein the network equipment is configured to:
  establish a first connection with a first NF for which the network equipment serves as a proxy;
  establish, on behalf of the first NF, a second connection that is towards a second NF and that is secure;
  selectively forward communication between the first and second NFs over the first and second connections, including transmitting and/or receiving the communication on behalf of the first NF over the second connection; and
  intercept the communication that the network equipment selectively forwards between the first and second NFs.

40. The network equipment of embodiment 39, the memory containing instructions executable by the processing circuitry wherein the network equipment is configured to perform the method of any of embodiments 2-20.

41. Network equipment configured for use in a core network for facilitating interception of protected communication between core network (CN) network functions (NFs), the network equipment comprising:
  processing circuitry and memory, the memory containing instructions executable by the processing circuitry wherein the network equipment is configured to:
  receive a discovery request that requests information indicating an NF service provider available to provide a service to an NF service consumer; and
  in response to the discovery request, reply with information indicating a proxy of the NF service provider or a proxy of the NF service consumer and with security information based on which a connection with the indicated proxy is to be secured.

42. The network equipment of embodiment 41, the memory containing instructions executable by the processing circuitry wherein the network equipment is configured to perform the method of any of embodiments 22-32.

43. Network equipment configured for use in a core network for intercepting protected communication between core network, CN, network functions, NFs, the network equipment comprising:
  a connection module for establishing a first connection with a first NF for which the network equipment serves as a proxy and establishing, on behalf of the first NF, a second connection that is towards a second NF and that is secure;
  a forwarding module for selectively forwarding communication between the first and second NFs over the first and second connections, including transmitting and/or receiving the communication on behalf of the first NF over the second connection; and
  an intercepting module for intercepting the communication that the network equipment selectively forwards between the first and second NFs.

44. The network equipment of embodiment 43, comprising one or more modules for performing the method of any of embodiments 2-20.

45. Network equipment configured for use in a core network for facilitating interception of protected communication between core network (CN) network functions (NFs), the network equipment comprising:
  a receiving module for receiving a discovery request that requests information indicating an NF service provider available to provide a service to an NF service consumer; and
  a reply module for, in response to the discovery request, replying with information indicating a proxy of the NF service provider or a proxy of the NF service consumer and with security information based on which a connection with the indicated proxy is to be secured.

46. The network equipment of embodiment 45, comprising one or more modules for performing the method of any of embodiments 22-32.

The invention claimed is:

1. A method performed by network equipment in a core network for intercepting protected communication between core network (CN) network functions (NFs), the method comprising:
   establishing a first connection with a first NF for which the network equipment serves as a proxy;
   establishing, on behalf of the first NF, a second connection that is towards a second NF and that is secure;
   selectively forwarding communication between the first and second NFs over the first and second connections, including transmitting and/or receiving the communication on behalf of the first NF over the second connection; and
   intercepting the communication that the network equipment selectively forwards between the first and second NFs;
   wherein the first connection is established responsive to the network equipment receiving a first connection request that requests a connection with the network equipment or the second connection is established responsive to the network equipment receiving a second connection request that requests a connection with the network equipment;
   wherein the first NF is an NF service consumer and the second NF is an NF service provider, or wherein the first NF is an NF service provider and the second NF is an NF service consumer;
   wherein the method further comprises receiving the first connection request from the NF service consumer or a proxy of the NF service consumer and identifying from the first connection request the NF service provider with which the NF service consumer requests to communicate.

2. The method of claim 1, wherein the first and second NFs are in different public land mobile networks (PLMNs) or the first and second NFs are in different network slices.

3. The method of claim 1, wherein the first connection or the second connection is secured based on a public key of the proxy.

4. The method of claim 1, wherein the second connection is secured with either a public key of the second NF or a public key of different network equipment serving as a proxy for the second NF.

5. The method of claim 1, wherein the network equipment is a core network edge proxy.

6. The method of claim 1, further comprising inspecting the intercepted communication to determine whether the communication is valid and/or not malicious and wherein the selectively forwarding comprises forwarding or not forwarding depending on said determination.

7. The method of claim 1, wherein the core network is a 5G core network.

8. The method of claim 1, wherein the first connection is established responsive to receiving the first connection request, and wherein the method further comprises identifying the second NF towards which to establish the second connection, wherein the second NF towards which to establish the second connection is identified based on:
   a port on which the first connection request is received; or
   a request identifier that identifies a discovery request made by or on behalf of the first NF; or
   information from a network repository function (NRF) identifying the second NF; or
   discovery of the second NF as being a type of NF indicated by an application layer request received by the network equipment.

9. Network equipment configured for use in a core network for intercepting protected communication between core network (CN) network functions (NFs), the network equipment comprising:
   processing circuitry and memory, the memory containing instructions executable by the processing circuitry wherein the network equipment is configured to:
      establish a first connection with a first NF for which the network equipment serves as a proxy;
      establish, on behalf of the first NF, a second connection that is towards a second NF and that is secure;
      selectively forward communication between the first and second NFs over the first and second connections, including transmitting and/or receiving the communication on behalf of the first NF over the second connection; and
      intercept the communication that the network equipment selectively forwards between the first and second NFs
   wherein the network equipment is configured to establish the first connection responsive to receiving a first connection request that requests a connection with the network equipment or establish the second connection responsive to receiving a second connection request that requests a connection with the network equipment;
   wherein the first NF is an NF service consumer and the second NF is an NF service provider, or wherein the first NF is an NF service provider and the second NF is an NF service consumer;
   wherein the memory contains instructions executable by the processing circuitry wherein the network equipment is further configured to:
      receive the first connection request from the NF service consumer or a proxy of the NF service consumer and identify from the first connection request the NF service provider with which the NF service consumer requests to communicate; or
      receive, over the first or second connection, an application layer request from the NF service consumer or a proxy of the NF service consumer and identify from the application layer request the NF service provider with which the NF service consumer requests to communicate; or
      receive from a network repository function (NRF) information identifying the NF service provider as the NF with which the NF service consumer requests to communicate.

10. The network equipment of claim 9, wherein the first and second NFs are in different public land mobile networks (PLMNs) or the first and second NFs are in different network slices.

11. The network equipment of claim 9, wherein the first connection or the second connection is secured based on a public key of the proxy.

12. The network equipment of claim 9, wherein the second connection is secured with either a public key of the second NF or a public key of different network equipment serving as a proxy for the second NF.

13. The network equipment of claim 9, the memory containing instructions executable by the processing circuitry wherein the network equipment is configured to:
   receive the first connection request from the NF service consumer or a proxy of the NF service consumer and identify from the first connection request the NF service provider with which the NF service consumer requests to communicate.

14. The network equipment of claim 9, wherein the network equipment is a core network edge proxy.

15. The network equipment of claim 9, the memory containing instructions executable by the processing circuitry wherein the network equipment is configured to inspect the intercepted communication to determine whether the communication is valid and/or not malicious and forward or not forward the communication depending on that determination.

16. The network equipment of claim 9, wherein the first connection is established responsive to receiving the first connection request, and wherein the memory contains instructions executable by the processing circuitry wherein the network equipment is configured to identify the second NF towards which to establish the second connection, based on:
- a port on which the first connection request is received; or
- a request identifier that identifies a discovery request made by or on behalf of the first NF; or
- information from a network repository function (NRF) identifying the second NF; or
- discovery of the second NF as being a type of NF indicated by an application layer request received by the network equipment.

* * * * *